United States Patent
Abuaiadh et al.

(10) Patent No.: US 7,191,300 B2
(45) Date of Patent: Mar. 13, 2007

(54) PARALLEL MEMORY COMPACTION

(75) Inventors: Diab Abuaiadh, Haifa (IL); Yoav Ossia, Haifa (IL); Avraham Ovsianko, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 10/744,723

(22) Filed: Dec. 23, 2003

(65) Prior Publication Data

US 2005/0138319 A1 Jun. 23, 2005

(51) Int. Cl.
*G06F 12/02* (2006.01)

(52) U.S. Cl. ............... 711/165; 707/206
(58) Field of Classification Search ......... 711/165; 707/206

See application file for complete search history.

(56) References Cited

U.S. PATENT DOCUMENTS 5,088,036 A * 2/1992 Ellis et al. ............ 707/206
6,910,213 B1 * 6/2005 Hirono et al. ......... 718/108

OTHER PUBLICATIONS

Ben-Yitzhak, Ori et al., "An Algorithm for Parallel Incremental Compaction", ISMM '02, Jun. 20-21, 2002, Berlin, Germany, pp. 100-105.

Lang, Bernard et al., "Incrementally Compacting Garbage Collection", Papers of the Symposium on Interpretive Technique, Jun. 24-26, 1978, St. Paul, Minnesota, United States, pp. 253-263.

Flood, Christine H. et al., "Parallel Garbage Collection for Shared Memory Multiprocessors", USENIX Java Virtual Machine Research and Technology Symposium (JVM '01), Monterey, CA, Apr. 2001.

* cited by examiner

*Primary Examiner*—Brian R. Peugh
*Assistant Examiner*—Jared Rutz
(74) *Attorney, Agent, or Firm*—Stephen E. Kaufman

(57) ABSTRACT

A method for compaction of objects within a computer memory, the method including dividing a memory space into a plurality of non-overlapping sections, selecting a plurality of source sections from among the sections, each containing at least one object, selecting a plurality of target sections from among the sections, and moving any of the objects from the source section to the target section, where each of a plurality of pairs of the source and target sections is exclusively available to a different process from among a plurality of processes operative to perform any of the steps with a predefined degree of concurrency.

22 Claims, 8 Drawing Sheets

PARALLEL MEMORY COMPACTION

FIELD OF THE INVENTION

The present invention relates to computer memory management in general, and more particularly to a compaction of memory objects.

BACKGROUND OF THE INVENTION

Computer operating systems (OS) typically provide a mechanism for storing "objects" of data. Often, the OS dynamically allocates a sub-section of memory for utilization by an application into which the application places its objects. When the application finishes its utilization of a sub-section of memory, the OS may reclaim the memory. This process of reclamation is popularly known as garbage collection (GC).

Garbage collectors from the mark-sweep family suffer from memory fragmentation, which is the creation of holes of unused space between objects, the space being previously populated by objects that are no longer required by an application. To reduce fragmentation, a garbage collector may compact memory by moving utilized objects to reduce the unutilized space between them. This has the effect of combining small areas of unutilized memory into larger chunks of free space, making memory allocation more efficient, and reducing the memory footprint of the application. A goal of compaction algorithms is to create the largest chunks of free space possible within memory, thus enabling easy re-allocation by the OS.

Typically, a compaction algorithm run as part of a single process will aggregate objects to one "side" of the memory space, thus freeing up the rest of the memory space. While multi-process compaction algorithms take advantage of multiple processors and/or multiple threads to speed up memory compaction, each process typically works independently. These multiple, independent compactions typically create a number of sub-sections within the memory where the allocated objects are relocated to one side of each sub-section. This leaves memory organized locally into relatively large chunks, while still leaving memory relatively fragmented at the global level.

SUMMARY OF THE INVENTION

The present invention discloses an improved system and method for global compaction of memory by multiple processes working in a local fashion.

In one aspect of the invention a method is provided for compaction of objects within a computer memory, the method including dividing a memory space into a plurality of non-overlapping sections, selecting a plurality of source sections from among the sections, each containing at least one object, selecting a plurality of target sections from among the sections, and moving any of the objects from the source section to the target section, where each of a plurality of pairs of the source and target sections is exclusively available to a different process from among a plurality of processes operative to perform any of the steps with a predefined degree of concurrency.

In another aspect of the present invention where the dividing step includes dividing into a number of sections that is a multiple of the number of the processes.

In another aspect of the present invention the dividing step includes dividing such that each of the sections m approximately equal in size.

In another aspect of the present invention the dividing step includes dividing such that boundaries of any of the sections fall within an empty region of the memory.

In another aspect of the present invention the dividing step includes dividing such that boundaries of any of the sections fall at the start or end of an object.

In another aspect of the present invention the moving step includes moving the objects from the source section to the target section such that the moved objects appear in the target section in the same order in which they appeared in the source section.

In another aspect of the present invention the moving step includes moving the objects from the source section to the target section such that the moved objects appear with less space between them in the target section as compared with the source section.

In another aspect of the present invention any of the steps are performed concurrently by each of the processes.

In another aspect of the present invention the target section selection step includes selecting any of the source sections as any of the target sections subsequent to any of the objects having been moved within or out of the source section.

In another aspect of the present invention the moving step includes moving at least one of the objects out of the source section and at least one of the objects within the source section.

In another aspect of the present invention the moving step includes moving any of the objects from the source section to a second one of the target sections subsequent to moving any of the objects from the source section to a second one of the target sections.

In another aspect of the present invention a system is provided for compaction of objects within a computer memory, the system including means for dividing a memory space into a plurality of non-overlapping sections, means for selecting a plurality of source sections from among the sections, each containing at least one object, means for selecting a plurality of target sections from among the sections, and means for moving any of the objects from the source section to the target section, where each of a plurality of pairs of the source and target sections is exclusively available to a different process from among a plurality of processes operative to control any of the means with a predefined degree of concurrency.

In another aspect of the present invention the means for dividing is operative to divide into a number of sections that is a multiple of the number of the processes.

In another aspect of the present invention the means for dividing is operative to divide such that each of the sections m approximately equal in size.

In another aspect of the present invention the means for dividing is operative to divide such that boundaries of any of the sections fall within an empty region of the memory.

In another aspect of the present invention the means for dividing is operative to divide such that boundaries of any of the sections fall at the start or end of an object.

In another aspect of the present invention the means for moving is operative to move the objects from the source section to the target section such that the moved objects appear in the target section in the same order in which they appeared in the source section.

In another aspect of the present invention the means for moving is operative to move the objects from the source section to the target section such that the moved objects appear with less space between them in the target section as compared with the source section.

In another aspect of the present invention any of the processes are concurrently operational.

In another aspect of the present invention the target section selection means is operative to select any of the source sections as any of the target sections subsequent to any of the objects having been moved within or out of the source section.

In another aspect of the present invention the means for moving is operative to move at least one of the objects out of the source section and at least one of the objects within the source section.

In another aspect of the present invention the means for moving is operative to move any of the objects from the source section to a second one of the target sections subsequent to moving any of the objects from the source section to a second one of the target sections.

In another aspect of the present invention a computer program is provided embodied on a computer-readable medium, the computer program including a first code segment operative to divide a memory space into a plurality of non-overlapping sections, a second code segment operative to select a plurality of source sections from among the sections, each containing at least one object, a third code segment operative to select a plurality of target sections from among the sections, and a fourth code segment operative to move any of the objects from the source section to the target section, where each of a plurality of pairs of the source and target sections is exclusively available to a different process from among a plurality of processes operative to perform any of the code segments with a predefined degree of concurrency.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1A:
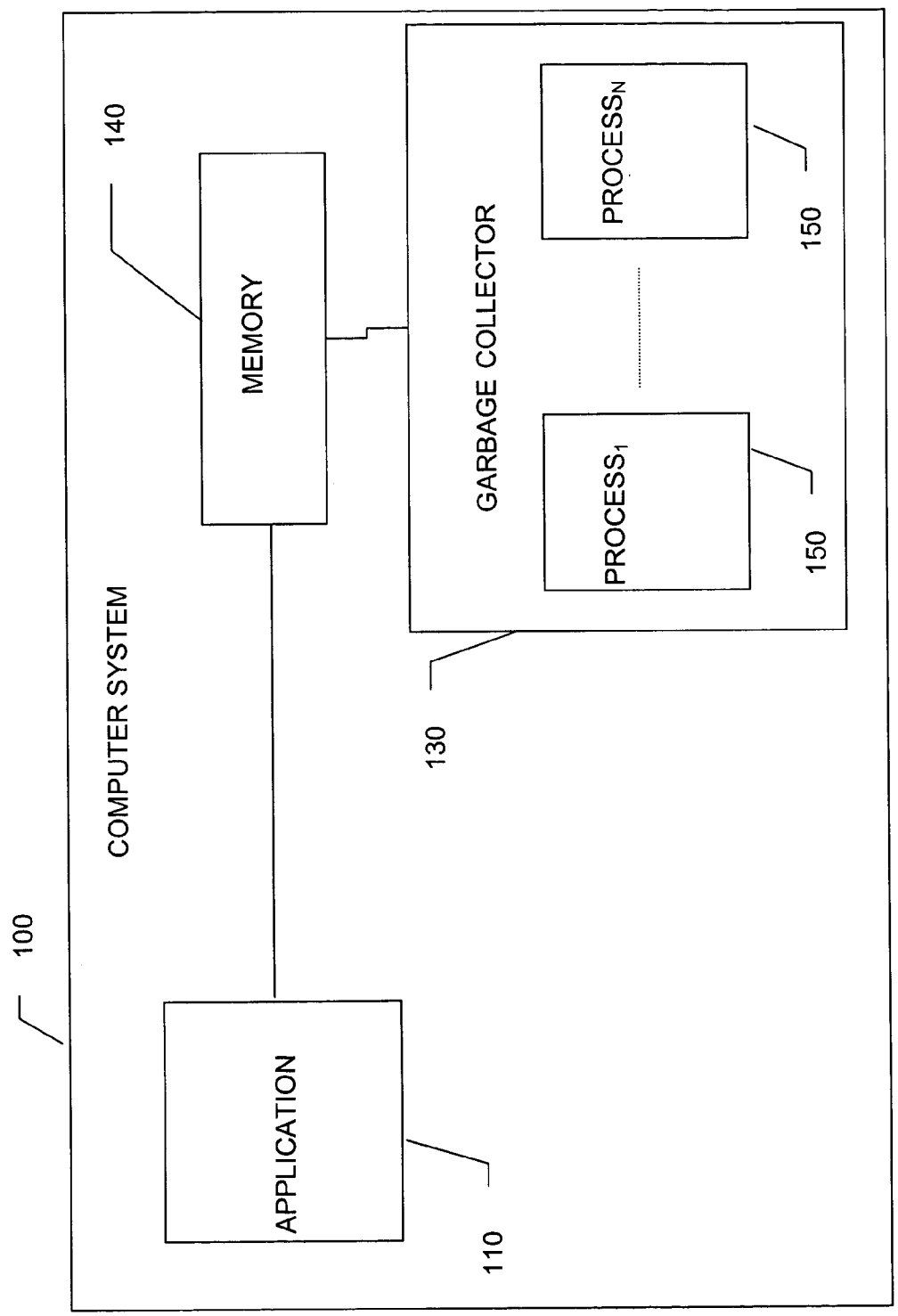
FIG. 1A is a simplified block diagram of a computer system, useful in understanding the present invention.
Figure 1B:
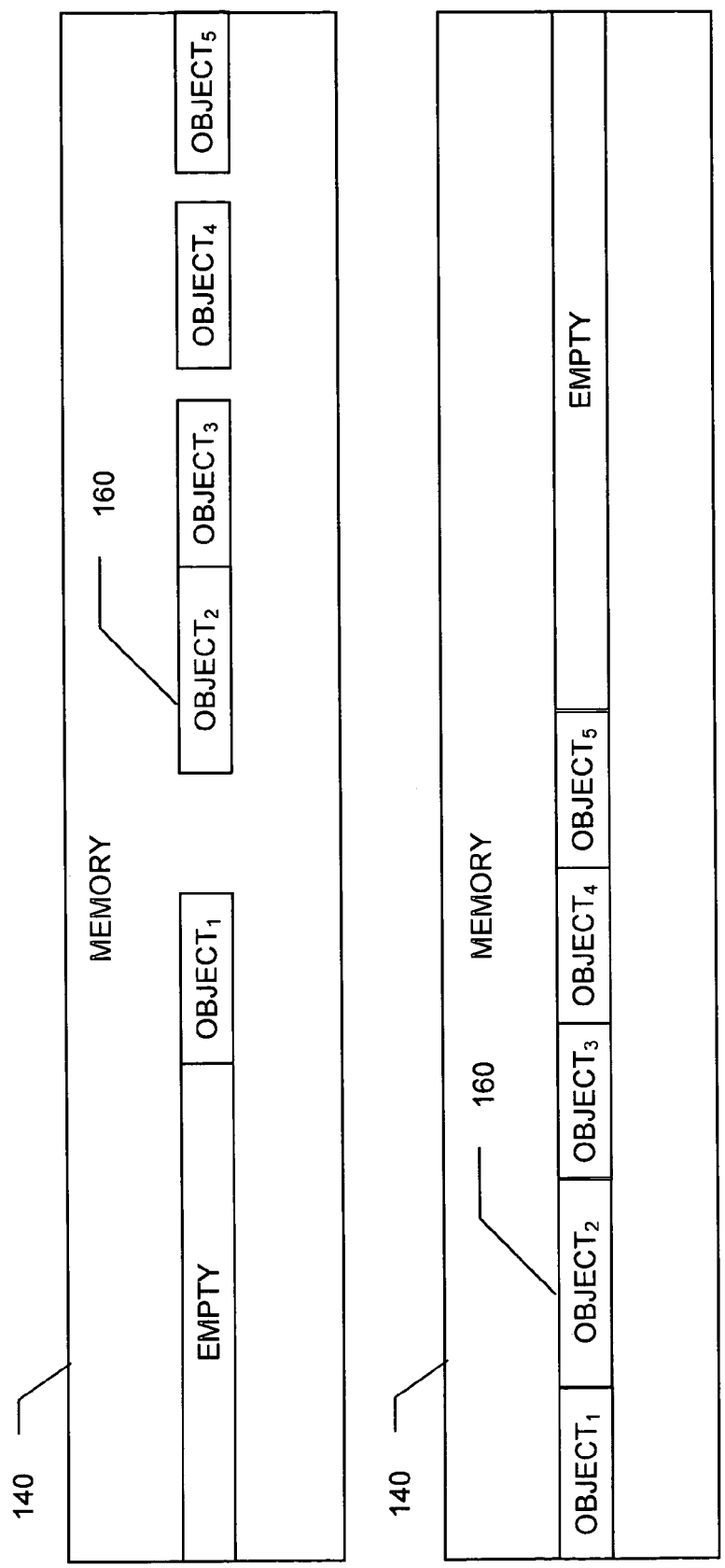
FIG. 1B is a pictorial representation of memory storage, useful in understanding the present invention.

Reference is now made to FIG. 1A, which is a simplified block diagram of a computer system, and additionally to FIG. 1B, which is a simplified pictorial representation of memory storage, both useful in understanding the present invention. A typical Computer System 100 employs an operating system, and may also provide an execution environment that mediates between an Application 110 and the operating system, such as a Java Virtual Machine (JVM). The execution environment also typically provides a Garbage Collector 130 to compact a Memory 140. Garbage Collector 130 preferably includes one or more Processes 150, where each Process 150 is capable of compacting some or all of a Memory 140 independently. During the course of execution, Application 110 may store one or more Objects 160 in Memory 140. For example, FIG. 1B depicts a series of Objects 160, labeled Object$_1$ through Object$_5$, stored in Memory 140. Empty spaces, particularly those that are too small to be utilized for storing new objects, may accumulate within Memory 140 in areas not allocated to stored Objects 160, such as the space denoted Empty and the spaces between Object$_1$ and Object$_2$, Object$_3$ and Object$_4$, and Object$_4$ and Object$_5$. Garbage Collector 130 may then compact Memory 140, aggregating Objects 160 to one side of the memory space. For example, Object$_1$ through Object$_5$ may move to the far right side of Memory 140, increasing the largest contiguous Empty block of memory. During the compaction of Memory 140, Garbage Collector 130 preferably preserves the locality of reference, i.e. the local composition of the Memory 140. Objects 160 that were near in memory to each other remain so after Garbage Collector 130 compacts Memory 140.

Figure 2:
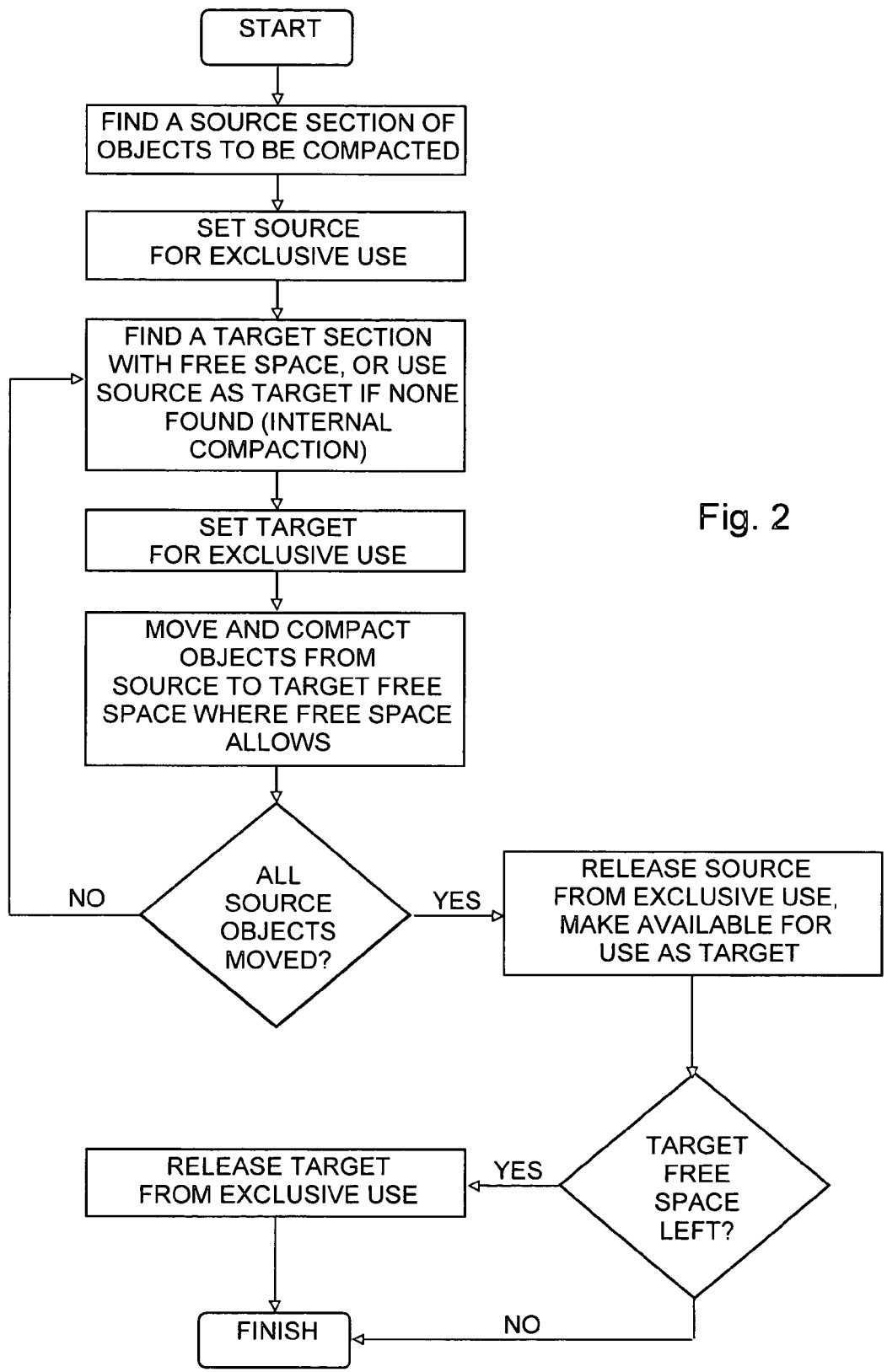
FIG. 2 is a simplified flowchart illustration of a method for global compaction of memory, operative in accordance with a preferred embodiment of the present invention.

Reference is now additionally made to FIG. 2, which is a simplified flowchart illustration of a method for global compaction of memory, operative in accordance with a preferred embodiment of the present invention. In the method of FIG. 2, Memory 140 is divided into a series of m non-overlapping Sections 200, where m is typically chosen to be a multiple K of the number of independent processes P that will be used to compact Memory 140. Processes P may be implemented within the context of one or more processors and/or one or more threads, and may be implemented using any predefined degree of concurrency. For example, if the garbage collector uses 2 processes, and if K is equal to 4, Memory 140 may be divided into 8 Sections 200. K is preferably chosen such that each Section 200 is larger than a predefined minimum size to ensure that locality of reference is preserved in relatively large groups of Objects 160, where most of the objects of the section are copied together. Given a predefined time limit for processing a section as described hereinbelow and an estimated speed at which a section is processed, a maximum section size may be predefined, where the sections are preferably set to be smaller than the predefined maximum size to insure good load balancing between the different processes. Each section m is preferably approximately equal in size, while allowing for section boundaries to be set to either fall within an empty region of memory or at the start or end of an object.

An array of pointers, denoted pToFreeSpace, is preferably allocated and initially set to NULL. Each pointer, denoted pToFreeSpace[i], preferably points to a free space in a particular Section 200 $i$ of Memory 140. Furthermore, a global variable numOfSectionsTaken is also preferably allocated and initialized to zero. Each Process 150 may access these global variables and may employ any known thread-protection methodology.

An iterative process commences where Sections 200 of Memory 140 are reorganized by multiple Garbage Collector processes, where each Garbage Collector process typically has exclusive access to a unique Section 200. Each Garbage Collector processes is also preferably capable of performing an atomic operation (i.e., uninterrupted by other processes) of checking a predicate and setting a value using conventional parallel programming techniques such as test-and-set or compare-and-swap. This operation may be denoted as: start-atomic-block, if (predicate) then operation, end-atomic-block. During the iterative process, each of the P Processes 150 preferably performs the following using any predefined degree of concurrency, and preferably fully concurrently:

1. Find a source Section 200, denoted S
   a. Set S to numOfSectionsTaken and increment numOfSectionsTaken.
   b. If S>m exit.

c. Set a local variable pFirstToMove to point to the first object in S.
2. Find a target Section 200, denoted T, as follows:
    Set T=0, and iterate as described hereinbelow:
    a. If pToFreeSpace[T]=NULL;
        i. T++;
        ii. If T>=numOfSectionsTaken, goto step 4
    b. Else
        i. Start-atomic-block
        ii. If pToFreeSpace[T]!=NULL Set pToFreeSpace[T]=NULL
        iii. End-atomic-block
        iv. Break, i.e. stop iterations. (goto step 3)
3. Move Objects 160 from Section S starting at pFirstToMove to the free space in Section T pointed to by pToFreeSpace[T] as long as there is still free spaces in Section T and S is not emptied. During the move, advance pFirstToMove to point to the next object to be moved.
    a. If the portion of Memory 140 pointed to by pToFreeSpace[T] in Section T is not large enough to contain all the Objects 160 in Section 200 S, leave pToFreeSpace[T] as NULL
    b. If free space remains in the target Section 200 T, set pToFreeSpace[T]=[start of free space in T].
    c. If there are still objects 160 left in Section S (pFirstToMove still points to an object) Goto step 2.
    d. Set pToFreeSpace[S] to point to the start of the free space in the source Section 160 S (which in this case is the start of the section).
    e. Goto step 1
4. If a target Section 200 T was previously not found:
    a. Compact the Objects 160 within Section S.
    b. Set pToFreeSpace[S] to point to the start of the newly created free space in the source Section 160 S.
    c. Goto step 1.

Thus, objects are preferably moved from Section S to Section T such that the moved objects appear in Section T in the same order in which they appeared in Section S, but with less space between the objects in Section T as compared with Section S, and preferably little or no space between them.

Figure 3A:
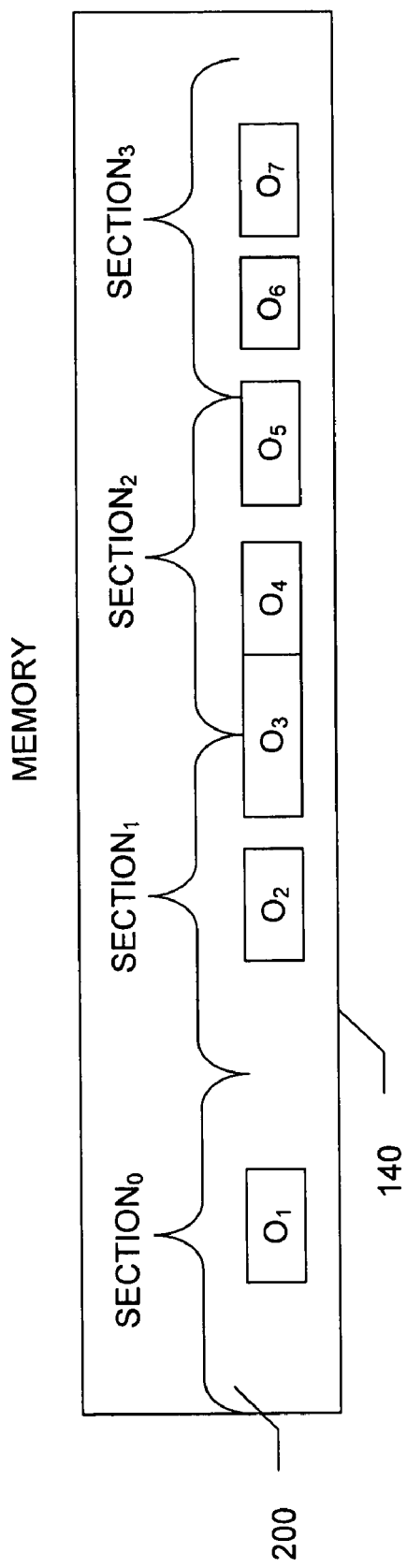
FIGS. 3A–3E, are simplified, time-sequential pictorial illustrations of an exemplary implementation of the method of FIG. 2.
Figure 3B:
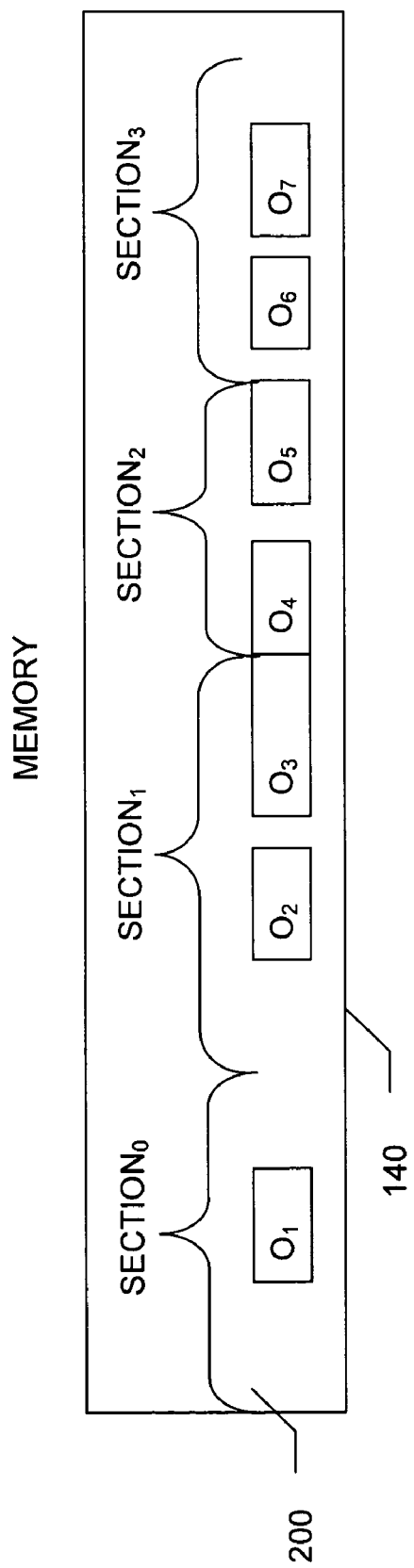
Figure 3C:
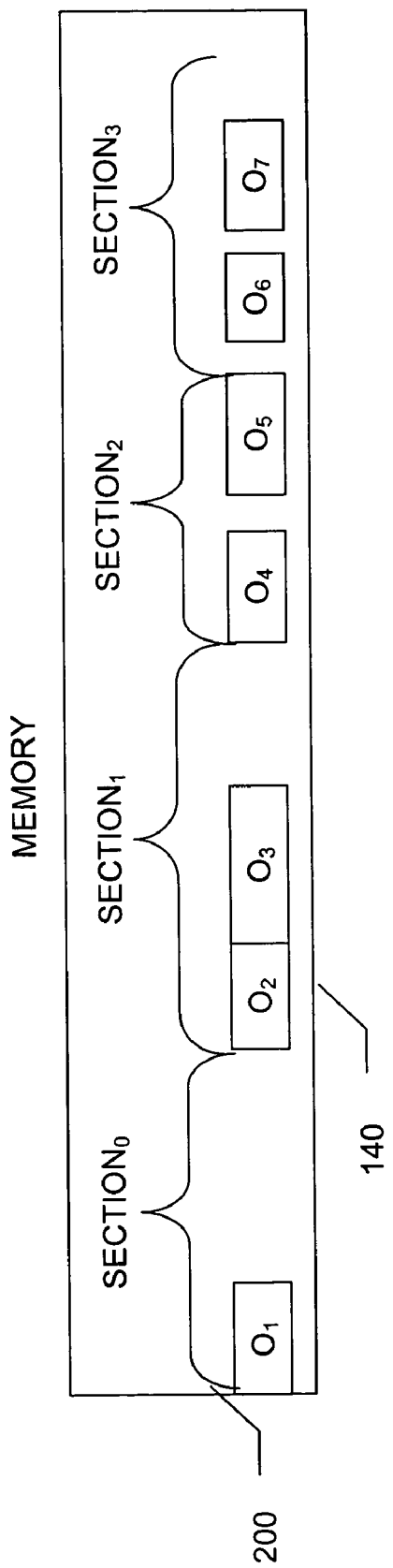
Figure 3D:
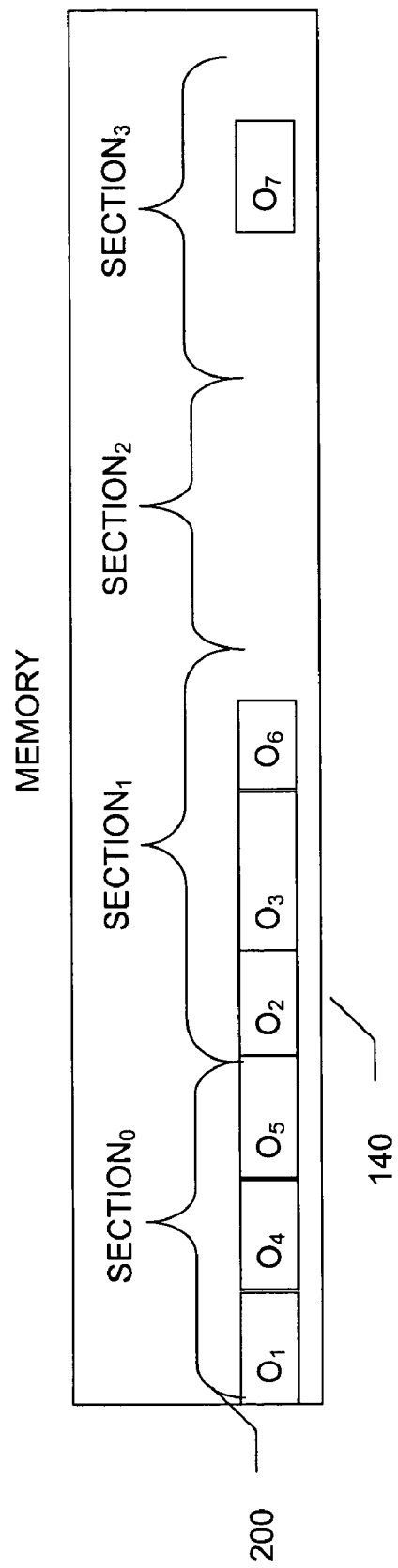
Figure 3E:
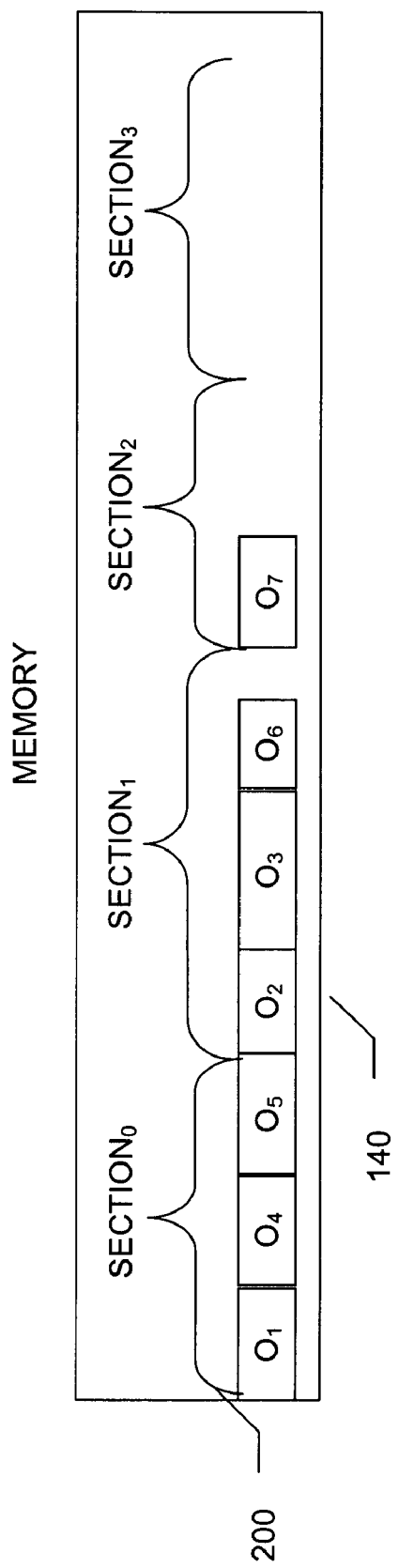

Reference is now made to FIGS. 3A–3E which are simplified, time-sequential pictorial illustrations of an exemplary memory space during various stages of compaction in accordance with the method of FIG. 2. In FIGS. 3A–3E two concurrent Processes 150 are employed to compact Memory 140, which is divided into four Sections 200 of equal size, designated $Section_0$ through Section3 as shown in FIG. 3A. In FIG. 3B, Sections 200 are shown adjusted such that section boundaries do not fall within an object. In FIG. 3C, each of the two Processes 150 are assigned a different Section 200, $Section_0$ and $Section_1$ respectively, and Memory 140 is compacted according to the method of FIG. 2 described hereinabove. $Section_0$ and $Section_1$ are concurrently compacted within themselves as no target section is exclusively available to receive objects from them. In FIG. 3D, the two Processes 150 are each assigned a different Section 200, namely $Section_2$ and $Section_3$, as source sections. The Process which is assigned $Section_2$ uses $Section_0$ as a target section, with $Object_4$ and $Object_5$ being moved from $Section_2$ into the empty space created in $Section_0$. At the same time, the other process which is assigned $Section_3$ uses $Section_1$ as a target section, with $Object_6$ being moved from $Section_3$ into the empty space created in $Section_1$. As target $Section_1$ is not left with enough space to accommodate $Object_7$, a new target section, $Section_2$, is selected, into which $Object_7$ is moved as shown in FIG. 3E.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for compaction of objects within a computer memory, the method comprising:
    dividing a memory space into a plurality of non-overlapping sections, wherein all of said memory space is available for writing objects therein prior to compacting said objects within said memory space;
    selecting a plurality of source sections from among said non-overlapping sections, each containing at least one of said objects;
    selecting a plurality of target sections from among said non-overlapping sections;
    pairing each of said source sections with a different one of said target sections, thereby creating a plurality of section pairs; and
    moving, within any selected one of said section pairs, any of said objects from said source section of said selected section pair to said target section of said selected section pair,
    wherein each of a plurality of said section pairs is exclusively available to a different process from among a plurality of processes operative to perform said moving with a predefined degree of concurrency.

2. A method according to claim 1 wherein said dividing comprises dividing said memory space into a number of said non-overlapping sections that is a multiple of the number of said processes.

3. A method according to claim 1 wherein said dividing comprises dividing said memory space such that boundaries of any of said non-overlapping sections fall within an empty region of said memory.

4. A method according to claim 1 wherein said dividing comprises dividing said memory space such that boundaries of any of said non-overlapping sections fall at the start or end of an object.

5. A method according to claim 1 wherein said moving comprises moving said objects from said source section of said selected section pair to said target section of said selected section pair such that said moved objects appear in said target section of said selected section pair in the same spatial order in which they appeared in said source section of said selected section pair.

6. A method according to claim 1 wherein said moving comprises moving said objects from said source section of said selected section pair to said target section of said selected section pair such that said moved objects appear with less space between them in said target section of said selected section pair as compared with said source section of said selected section pair.

7. A method according to claim 1 wherein said moving is performed concurrently by each of said processes.

8. A method according to claim 1 wherein said selecting a plurality of target sections comprises selecting any of said source sections as any of said target sections subsequent to any of said objects having been moved within or out of said selected source section.

9. A method according to claim 1 wherein said moving comprises moving at least one of said objects out of said source section of said selected section pair and at least one of said objects within said source section of said selected section pair.

10. A method according to claim 1 wherein said moving comprises:
subsequent to moving any of said objects from said source section of said selected section pair to said target section of said selected section pair, pairing said source section of said selected section pair with a different one of said target sections, thereby creating a new section pair; and
moving any of said objects from said source section of said new section pair to said target section of said new section pair.

11. A system for compaction of objects within a computer memory, the system comprising:
means for dividing a memory space into a plurality of non-overlapping sections, wherein all of said memory space is available for writing objects therein prior to compacting said objects within said memory space;
means for selecting a plurality of source sections from among said non-overlapping sections, each containing at least one of said objects;
means for selecting a plurality of target sections from among said non-overlapping sections;
means for pairing each of said source sections with a different one of said target sections to create a plurality of section pairs; and
means for moving, within any selected one of said section pairs, any of said objects from said source section of said selected section pair to said target section of said selected section pair,
wherein each of a plurality of said section pairs is exclusively available to a different process from among a plurality of processes operative to control any of said means with a predefined degree of concurrency.

12. A system according to claim 11 wherein said means for dividing is operative to divide said memory space into a number of said non-overlapping sections that is a multiple of the number of said processes.

13. A system according to claim 11 wherein said means for dividing is operative to divide said memory space such that boundaries of any of said non-overlapping sections fall within an empty region of said memory.

14. A system according to claim 11 wherein said means for dividing is operative to divide said memory space such that boundaries of any of said non-overlapping sections fall at the start or end of an object.

15. A system according to claim 11 wherein said means for moving is operative to move said objects from said source section of said selected section pair to said target section of said selected section pair such that said moved objects appear in said target section of said selected section pair in the same spatial order in which they appeared in said source section of said selected section pair.

16. A system according to claim 11 wherein said means for moving is operative to move said objects from said source section of said selected section pair to said target section of said selected section pair such that said moved objects appear with less space between them in said target section of said selected section pair as compared with said source section of said selected section pair.

17. A system according to claim 11 wherein any of said processes are concurrently operational.

18. A system according to claim 11 wherein said means for selecting a plurality of target sections is operative to select any of said source sections as any of said target sections subsequent to any of said objects having been moved within or out of said selected source section.

19. A system according to claim 11 wherein said means for moving is operative to move at least one of said objects out of said source section of said selected section pair and at least one of said objects within said source section of said selected section pair.

20. A system according to claim 11 wherein said means for moving is operative, subsequent to moving any of said objects from said source section of said selected section pair to said target section of said selected section pair, to pair said source section of said selected section pair with a different one of said target sections, thereby creating a new section pair; and to move any of said objects from said source section of said new section pair to said target section of said new section pair.

21. A computer program embodied on a computer-readable medium, the computer program comprising:
a first code segment operative to divide a memory space into a plurality of non-overlapping sections;
a second code segment operative to select a plurality of source sections from among said non-overlapping sections, each containing at least one object;
a third code segment operative to select a plurality of target sections from among said non-overlapping sections;
a fourth code segment operative to pair each of said source sections with a different one of said target sections to create a plurality of section pairs; and
a fifth code segment operative to move any of said objects from said source section of said selected section pair to said target section of said selected section pair,
wherein each of a plurality of said section pairs is exclusively available to a different process from among a plurality of processes operative to perform any of said code segments with a predefined degree of concurrency.

22. A method according to claim 1 wherein said selecting said target sections comprises selecting sections from said plurality of source sections, and wherein said moving any of said objects from said source sections to said target sections comprises moving said objects within said source sections, and wherein, upon compaction of said source sections, classifying said source sections as target sections.

* * * * *